United States Patent
Cai et al.

(10) Patent No.: US 8,295,456 B2
(45) Date of Patent: Oct. 23, 2012

(54) IMS BUDGET CONTROL FOR A MEDIA CHANGE DURING AN IMS SESSION

(75) Inventors: Yigang Cai, Naperville, IL (US); Qinghong He, Beijing (CN); Ke Pei, Beijing (CN); Jie Su, Beijing (CN); Chaoliang Zhang, Beijing (CN); Jay Z. Zhao, Beijing (CN)

(73) Assignee: Alcatel Lucent, Paris (FR)

( * ) Notice: Subject to any disclaimer, the term of this patent is extended or adjusted under 35 U.S.C. 154(b) by 1595 days.

(21) Appl. No.: 11/369,132

(22) Filed: Mar. 6, 2006

(65) Prior Publication Data

US 2007/0174400 A1 Jul. 26, 2007

(30) Foreign Application Priority Data

Jan. 24, 2006 (CN) .......................... 2006 1 0006044

(51) Int. Cl.
*H04M 15/00* (2006.01)

(52) U.S. Cl. .............. 379/114.01; 379/114.17; 455/406; 455/408

(58) Field of Classification Search ............... 370/395.2, 370/465, 336; 705/39; 379/114.01, 114.17; 455/406, 408
See application file for complete search history.

(56) References Cited

U.S. PATENT DOCUMENTS

| | | | |
|---|---|---|---|
| 2005/0026558 A1* | 2/2005 | Stura et al. .................... | 455/3.06 |
| 2005/0213580 A1* | 9/2005 | Mayer et al. ................ | 370/395.2 |
| 2005/0240520 A1* | 10/2005 | Stura et al. ....................... | 705/39 |
| 2007/0041536 A1* | 2/2007 | Koskinen et al. ......... | 379/114.28 |
| 2007/0103117 A1* | 5/2007 | Burghardt ...................... | 320/119 |
| 2008/0195535 A1* | 8/2008 | Liu ................................. | 705/39 |

OTHER PUBLICATIONS

3GPP TS 32.240, "Technical Specification Group Services and System Aspects; Telecommunication Management; Charging Management; Charging Architecture and Principals (Release 6)", version 6.0.0 (Sep. 2004).

* cited by examiner

*Primary Examiner* — Gerald Gauthier
*Assistant Examiner* — Simon King
(74) *Attorney, Agent, or Firm* — Duft Bornsen & Fishman LLP

(57) ABSTRACT

IMS gateway systems and methods are disclosed for providing budget control in an IMS network. IMS networks allow for media changes (e.g., audio to audio/video) during an IMS session. An IMS gateway system described herein receives a session control message (e.g., SIP INVITE message) responsive to the media change during the session. The IMS gateway system identifies media information for the new media in the session control message. The IMS gateway system generates a corresponding charging request message, and includes media information for the new media in the charging request message. The IMS gateway system then transmits the charging request message to an online charging system (OCS) to provide for charging of the session based on the new media for the session.

20 Claims, 10 Drawing Sheets

SIP INVITE

FIG. 5

CCR MESSAGE

[Event-Type]
    [SIP-Method] : INVITE sip
    [Event]
    [Content-Type] : application/sdp
[Content-Length] : (....)
[Content-Disposition]

[Role-of-node]
[User-Session-ID] : cb03a0s09a2sdfglkj490333

[Calling-Party-Address] : +1-212-555-2222@home1.net
[Called-Party-Address] : <sip:user1_public1@home1.net
[Time-stamps]
    [SIP-Request-Timestamp]
    [SIP-Response-Timestamp]
[IMS-Charging-Identifier] : AyretyU0dm+6O2IrT5tAFrbHLso=023551024

[Cause-Code]
[Node-Functionality]

[SDP-Session-Description] : IN IP4 192.11.34.55
[SDP-Media-Component]
    [SDP-Media-Name] : m=audio 3456 RTP/AVP 97 0 96
    [SDP-Media-Description]   : b=AS:25.4
                                   : a=rtpmap:97 G.711 {G.729}
                                   : a=fmtp:97 mode-set=0,2,5,7; maxframes=2
                                   : a=rtpmap:96 telephone-event
[UUS-Data]
    [Amount-of-UUS-Data]
    [Mime-type]

IMS BUDGET CONTROL FOR A MEDIA CHANGE DURING AN IMS SESSION

RELATED APPLICATIONS

This patent application claims priority to a foreign patent application filed in the Chinese Patent Office, having the application number 200610006044.0 and filed on Jan. 24, 2006.

BACKGROUND OF THE INVENTION

1. Field of the Invention

The invention is related to the field of communications, and in particular, to IMS budget control that handles online charging for media changes during an IMS session.

2. Statement of the Problem

As set forth in the $3^{rd}$ Generation Partnership Project (3 GPP), an IP Multimedia Subsystem (IMS) provides a common core network having access-agnostic network architecture for converged networks. Service providers are accepting this architecture in next generation network evolution. The IMS architecture is initially defined by the 3 GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

On the IMS platform, the traditional supplementary services, such as call forwarding, conferencing, and call waiting are available for IMS subscribers. Also, many new data services, such as instant messaging, video calls, video on wait, and web-based services, will also be available for the IMS subscribers.

Providing efficient IMS online charging for operator revenue generation is important to the successful deployment of IMS networks. Several 3 GPP technical specifications describe online charging for IMS networks. For instance, the 3 GPP TS 32.200 specification describes an online charging system (OCS) having a session-based charging function. The OCS is coupled to a serving-call session control function (S-CSCF) through an IMS service control (ISC) interface. The S-CSCF controls a call session for a calling party or a called party and communicates with the OCS over the ISC interface to provide online charging for the call session. However, an ISC interface is a service interface that does not support online charging. Therefore, in order to use the ISC interface between the S-CSCF and the OCS for online charging, additional functionality would unfortunately need to be added to the OCS.

To avoid overloading the OCS with additional functionality and to keep the online charging architecture consistent, the interface between the S-CSCF and the OCS may be changed to support online charging instead of adding functionality to the OCS. One option for an interface that supports online charging is to extend the ISC interface to allow for charging mechanisms. The ISC interface would then be both a service interface and a charging interface. Unfortunately, using the ISC interface as a hybrid service/charging interface may not be acceptable for standardization desired by the 3 GPP.

Another option is to use the Ro interface instead of the ISC interface because the Ro interface already supports online charging. The 3 GPP TS 32.296 specification suggests using the Ro interface for online charging by introducing an IMS gateway function that acts as a gateway between the S-CSCF and the OCS.

FIG. 1 illustrates an IMS online charging architecture 100 as suggested by the 3 GPP in the prior art. Online charging architecture 100 is described in 3 GPP TS 32.240 and 32.260. Online charging architecture 100 includes IMS gateway function 102, an S-CSCF 104, and an OCS 106. OCS 106 includes a session-based charging function (SBCF) and an event-based charging function (EBCF). The session-based charging function is responsible for online charging of network/subscriber sessions, such as voice calls or IMS sessions. The event-based charging function performs event-based online charging (also referred to as "context charging") in conjunction with any application servers.

IMS gateway function 102 communicates with S-CSCF 104 over the ISC interface 105 and communicates with OCS 106 over the Ro interface 107. For online charging communication between S-CSCF 104 and the session-based charging function in OCS 106, S-CSCF 104 does not trigger online charging events and thus does not include a Charging Trigger Function (CTF). Instead, the ISC interface 105 is employed by the S-CSCF 104, implying that online charging is transparent to S-CSCF 104 and appears like any other service controlled by a SIP application server. Therefore, if support for Ro-based online charging is required, a special CTF is needed in order to mediate between the Ro-based session-based charging function and the SIP-based service control. This role is taken by IMS gateway function 102, which translates between SIP session control towards S-CSCF 104 and the Ro credit control towards OCS 106.

Unfortunately, the 3 GPP specifications do not describe how to use the IMS gateway function for online charging. The specifications also do not resolve how the ISC interface, the Ro interface, and the S-CSCF would function together, and how the IMS gateway function would operate to provide budget control for online charging.

IMS networks present additional problems regarding online charging of IMS sessions. IMS allows for media changes during an active IMS session. For instance, the media for an IMS session may initially be audio. At some point during the IMS session, the media may be changed to audio and video. A further problem exists that the 3 GPP specifications do not describe how to handle online charging when a media change occurs during an IMS session.

SUMMARY OF THE SOLUTION

The invention solves the above and other related problems with systems and methods for identifying a media change during an IMS session, and generating a charging request message to provide online charging for the session based on the new media. The session is then billed or charged based on the new media for the session. The systems and methods of the invention can thus more accurately charge for IMS sessions where the media has been changed.

One embodiment of the invention comprises an IMS gateway system of an IMS network that handles charging for media changes during a session. The IMS gateway system includes a session control interface for communicating with a serving-call session control function (S-CSCF), a budget control system, and a charging interface for communicating with an online charging system (OCS). When an IMS session is initiated in the IMS network, the budget control system receives a session control message (e.g., a SIP INVITE message) from the S-CSCF through the session control interface. The budget control system identifies a media description in the session control message, where the media description includes information on the media for the session. The budget control system generates a charging request message (e.g., Diameter Ro CCR message) that includes information on the media identified in the media description of the session control message, and transmits the charging request message to the OCS through the charging interface.

The OCS processes the charging request message to determine a rating for the session based on the media, allocates a quota for the session, etc. The budget control system then receives a charging response message (e.g., Diameter Ro CCA message) from the OCS through the charging interface. The budget control system then performs budget control for the session based on the allocated quota of units.

During the IMS session, the media for the session may be changed by one or more of the subscribers of the session. For instance, if the media type is initially audio, a subscriber may change the media type to both audio and video. Alternatively, if the media type is video and the media format is H.261, a subscriber may change the media format to MPEG. Responsive to the media change, the S-CSCF transmits a session control message (e.g., SIP (Re) INVITE message) to the IMS gateway system.

The session control interface of the IMS gateway system receives the session control message from the S-CSCF. The session control message includes a media description that includes information on the new media for the session. The media has been changed at this point, so the media description identifies a different media than the media description of the previous session control message. The budget control system processes the session control message to identify the media change during the session. The budget control system generates a charging request message for the new media for the session responsive to identifying the media change. The charging request message includes information on the new media identified in the media description of the session control message. The charging interface transmits the charging request message to the OCS. The charging interface then receives a charging response message from the OCS that indicates a quota for the new media for the session. Responsive to receiving the charging response message, the budget control system performs budget control for the session based on the new quota for the new media.

The IMS gateway system of the invention advantageously identifies a media change during the session, and informs the OCS of the media change. The OCS can then adjust online charging for the session based on the media change to more accurately charge for the session.

In another embodiment, the budget control system maps parameters in the session control message to parameters in the charging request message. For instance, the budget control system identifies a session description, a time description, and a media description in the session control message. The budget control system then identifies one or more parameters in the descriptions that should be included in the charging request message, and includes these identified parameters in the charging request message. More particularly, the budget control system identifies media information for the session from the media description, such as media type, media format, etc, and includes the media information in the charging request message. The budget control system can thus translate messages between the session control interface and the charging interface.

Another embodiment of the invention comprises an associated method of operating an IMS gateway system. The invention may include other exemplary embodiments described below.

DESCRIPTION OF THE DRAWINGS

The same reference number represents the same element on all drawings.

FIGS. 4-5 illustrate an exemplary mapping of information from a SIP INVITE message to a CCR message in an exemplary embodiment of the invention.

DETAILED DESCRIPTION OF THE INVENTION

FIGS. 2-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
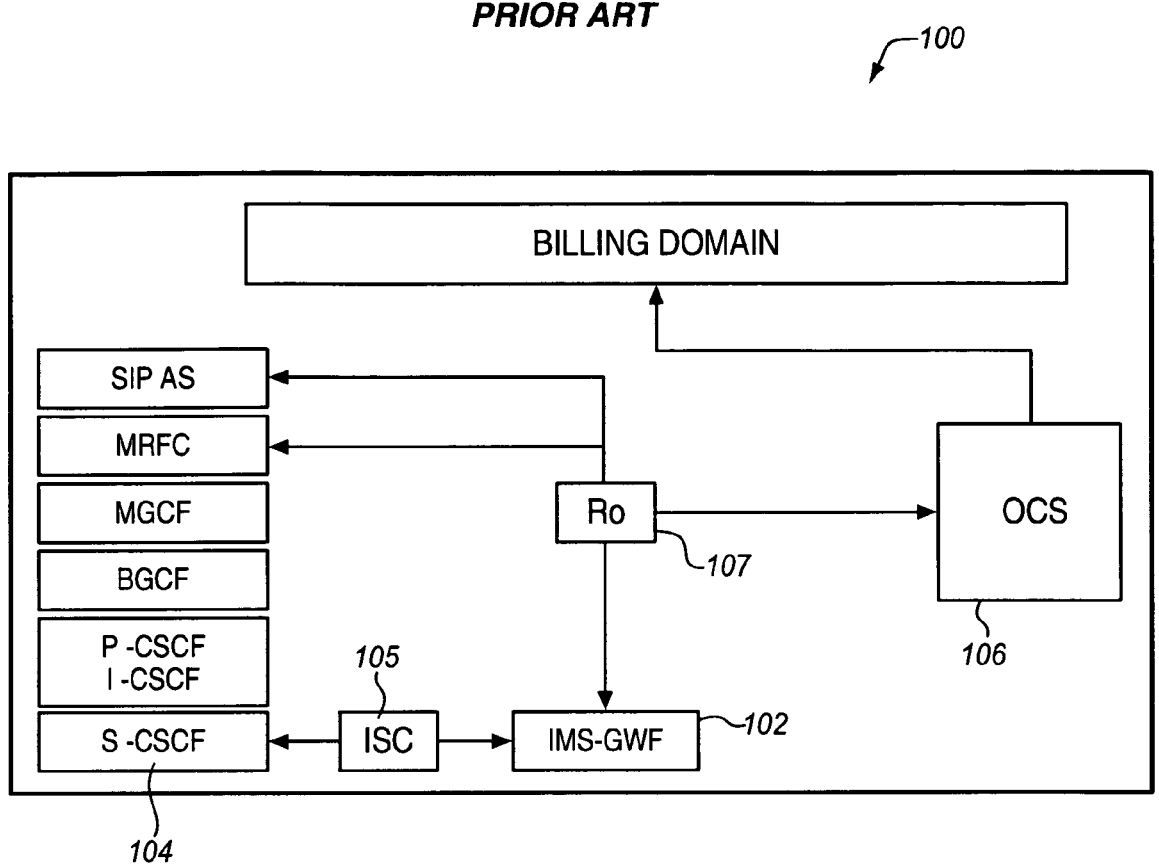
FIG. 1 illustrates the 3 GPP online charging architecture including the IMS gateway function in the prior art.
Figure 2:
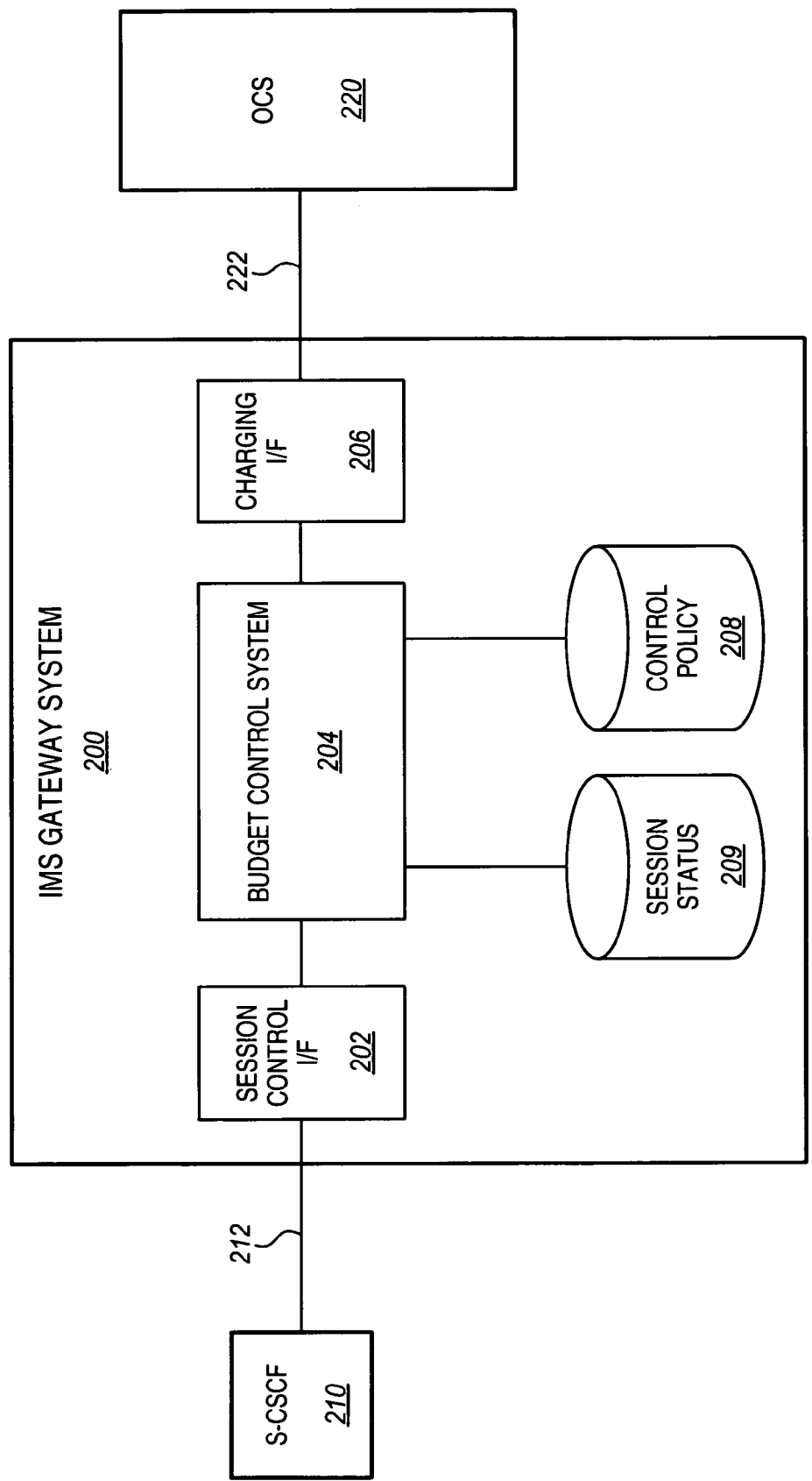
FIG. 2 illustrates an IMS gateway system in an exemplary embodiment of the invention.

FIG. 2 illustrates an IMS gateway system 200 of an IMS network in an exemplary embodiment of the invention. IMS gateway system 200 may be included in the IMS charging architecture 100 of FIG. 1 in a similar manner to IMS gateway function 102, but IMS gateway system 200 may also be implemented in other IMS charging architectures. IMS gateway system 200 includes a session control interface 202, a budget control system 204, a charging interface 206, a control policy database 208, and a session status database 209. Session control interface 202 is coupled to a serving-call session control function (S-CSCF) 210 over a link 212. Charging interface 206 is coupled to an online charging system (OCS) 220 over a link 222. IMS gateway system 200 may include other components, devices, or systems not shown in FIG. 2 for the sake of brevity.

Budget control system 204 comprises any system, device, or server adapted to perform budget control for a session. Budget control comprises any charging functionality used for charging for a session, such as by communicating with OCS 220. The budget control may be for online charging typically used for prepaid applications. Budget control system 204 may be implemented as software, hardware, or a combination of hardware and software. In a software implementation, budget control system 204 may be comprised of instructions that are stored on storage media. The instructions may be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accordance with the invention. The term "processing system" refers to a single processing device or a group of inter-operational processing devices. Some examples of processors are computers, integrated circuits, and logic circuitry. Those skilled in the art are familiar with instructions, processors, and storage media.

Session control interface 202 comprises any interface adapted to transmit/receive session control messages to/from S-CSCF 210. Session control messages comprise any messages used for session start-up, session management or maintenance, or session tear-down. Session control interface 202 may comprise an IMS service control (ISC) interface as suggested by the 3 GPP, but may comprise another interface in other embodiments.

Charging interface 206 comprises any interface adapted to transmit/receive charging messages to/from OCS 220. Charging messages comprise any messages used for online charging of sessions in an IMS network. Charging interface 206 may comprise a Diameter Ro interface as suggested by the 3 GPP, but may comprise another interface in other embodiments.

When in operation, assume that an IMS session is being initiated in the IMS network between two subscribers (or user endpoints) that are not shown. As part of initiating the session, S-CSCF 210 transmits a session control message to IMS gateway system 200 to provide charging for the session. One example of a session control message for initiating a session is a SIP INVITE message. Responsive to the session control message, budget control system 204 identifies a media description in the session control message that includes information on the media for the session. The media information may include a media type for the session, such as audio, video, text, application, data, control, or any other registered media type. The media information may also include a media format. For instance, if the media type comprises audio, then the media format may comprise MP3, MP4, wave, etc. If the media type comprises video, then the media format may comprise H.261, MPEG, etc. Any attributes provided in the media description are generally referred to herein as "media".

Budget control system 204 then generates a charging request message that includes information on the media for the session. Budget control system 204 transmits the charging request message to OCS 220 through charging interface 206. One example of a charging request message is a Diameter Ro Credit Control Request (CCR) message.

OCS 220 processes the charging request message to determine a rating for the session. The rating depends on the media used for the session. For instance, if the media for the session comprises an MPEG video, then the rating may be higher than a rating for MP3 audio. OCS 220 also performs other charging functions, such as allocating a quota for the session. Budget control system 204 then receives a charging response message from OCS 220 through charging interface 206. The charging response message indicates an allocated quota of units for the session. One example of a charging response message is a Diameter Ro Credit Control Answer (CCA) message. Budget control system 204 then performs budget control for the session based on the allocated quota of units. During budget control, budget control system 204 monitors whether the allocated quota has been used up, and requests a new quota from OCS 220 if the existing quota is consumed and the session still continues.

During the IMS session, the media for the session may be changed by one or more of the subscribers of the session. For instance, if the media type is initially audio, a subscriber may change the media type to both audio and video. Alternatively, if the media type is video and the media format is H.261, a subscriber may change the media format to MPEG. Responsive to the media change, S-CSCF 210 transmits a session control message to IMS gateway system 200. One example of the session control message in this instance is another SIP INVITE message (Re-INVITE). According to features and aspects herein, IMS gateway system 200 operates as follows to handle the media change.

Figure 3:
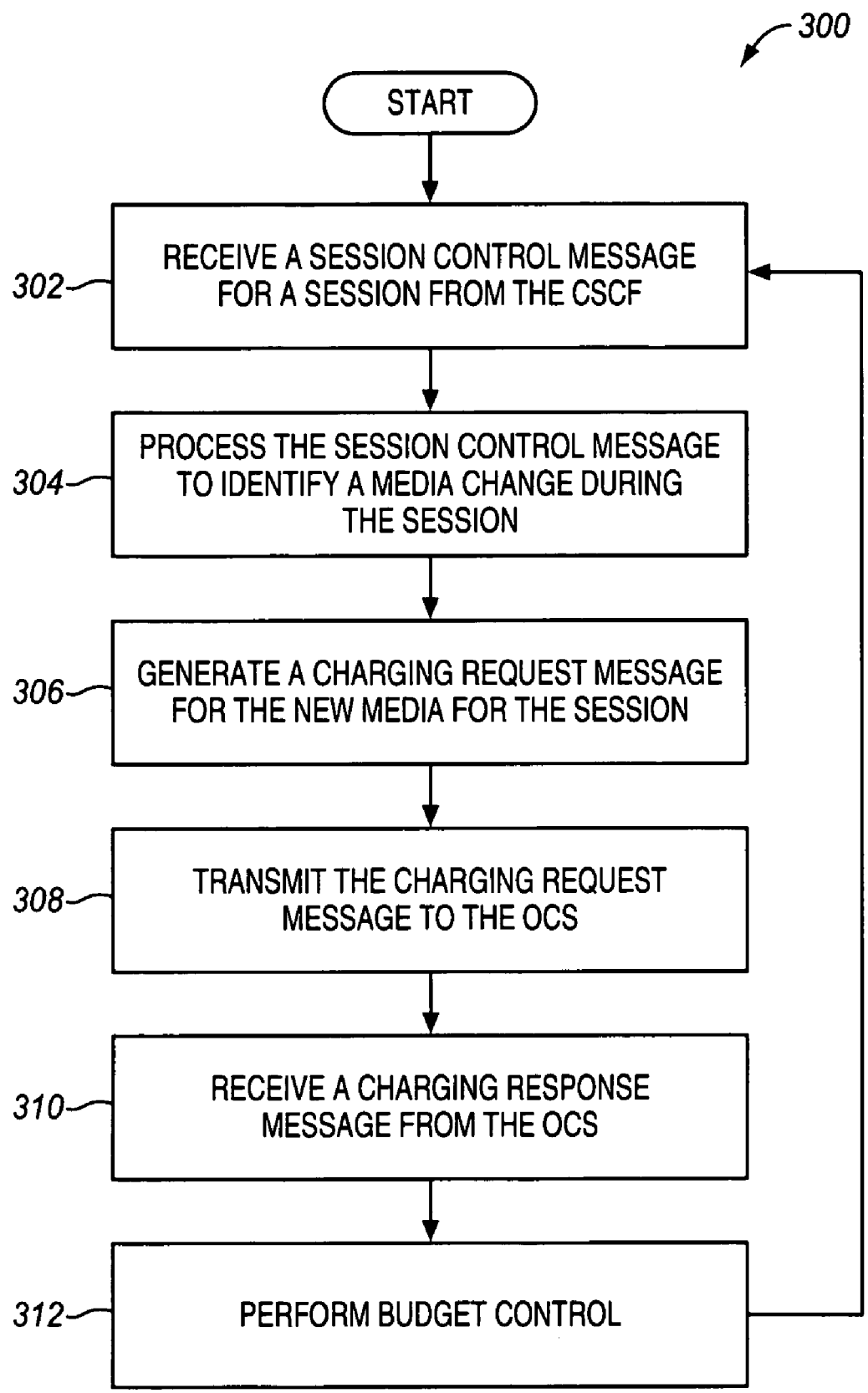
FIG. 3 is a flow chart illustrating a method of operating an IMS gateway system in an exemplary embodiment of the invention.

FIG. 3 is a flow chart illustrating a method 300 of operating IMS gateway system 200 in an exemplary embodiment of the invention. Method 300 describes some basic steps of operating IMS gateway system 200, but other steps may also be performed as needed or desired.

In step 302, session control interface 202 receives the session control message from S-CSCF 210. The session control message includes a media description that includes information on the media for the session. The media has been changed at this point, so the media description identifies a different media than the media description of the previous session control message. Budget control system 204 processes the session control message to identify the media change during the session in step 304. For instance, budget control system 204 may identify a media description in the present session control message that includes information on the new media for the session. Budget control system 204 may then compare the new media indicated in the present session control message to previous media indicated in a previous session control message to identify whether a media change has occurred. Information on the previous media for the session may be stored in session status database 209.

In step 306, budget control system 204 generates a charging request message for the new media for the session responsive to identifying the media change. The charging request message includes information on the new media for the session. In step 308, charging interface 206 transmits the charging request message to OCS 220.

In step 310, charging interface 206 receives a charging response message from the OCS 220. The charging response message may indicate a new quota for the new media for the session. There may be instances where a quota is not returned to IMS gateway system 200, such as when the account of the subscriber has been depleted, but the assumption in this embodiment is that a quota is returned. Responsive to receiving the charging response message, budget control system 204 performs budget control for the session in step 312. For instance, budget control system 204 begins decrementing from the new quota based on usage for the session.

If IMS gateway system 200 receives another session control message from S-CSCF 210 indicating a media change, then IMS gateway system 200 repeats method 300 to handle the media change.

IMS gateway system 200 advantageously identifies a media change during the session, and informs OCS 220 of the media change. OCS 220 can then adjust online charging for the session based on the media change to more accurately charge for the session.

In generating the charging request message, budget control system 204 maps parameters in the session control message to parameters in the charging request message. For instance, budget control system 204 identifies a session description, a time description, and a media description in the session control message. Budget control system 204 then identifies one or more parameters in the descriptions that should be included in the charging request message, and includes these identified parameters in the charging request message. More particularly, budget control system 204 identifies media information for the session from the media description, such as media type, media format, etc, and includes the media information for the new media in the charging request message.

The following describes exemplary mapping by budget control system 204. The following assumptions are made for this example. Session control interface 202 comprises an ISC interface and the session control messages are SIP messages, such as a SIP INVITE message, a SIP 200 OK message, or a SIP ACK message. The session description, the time description, and the media description of the SIP messages are in Session Description Protocol (SDP). SDP is a textual description of the name and purpose of the session, and the media, protocols, codec formats, time, and transport information for the session. Charging interface 206 comprises an Ro interface, the charging request messages comprise CCR messages, and the charging response messages comprise CCA messages.

To provide the desired mapping and budget control, control policy database 208 includes provisioned session control policies, such as the special information to be conveyed in the CCR, the trigger for a CCR [Initial] (e.g. a SIP INVITE, SIP 200 OK, or SIP ACK message), the trigger for a CCR [Update] (e.g., SIP (Re) INVITE or allocated quota used up), the threshold of an allocated quota for requesting a new quota, terminate SIP session or Redirect to recharge service when insufficient balance, time-out timer configuration, etc. Control policy database 208 may also include parsing rules that are described herein. Session status database 209 stores SIP/Diameter session status including media and quota information. When a SIP session begins, the SIP and SDP information carried in the SIP messages are kept in session status database 209 until the SIP session ends. To reduce the traffic between budget control system 204 and OCS 220, the interim SDP information need not be exchanged with OCS 220 since it may not impact the quota allocation. The final information may not be included in the SIP 200 OK message, so the SDP information in SIP messages is tracked by session status database 209.

Figure 4:
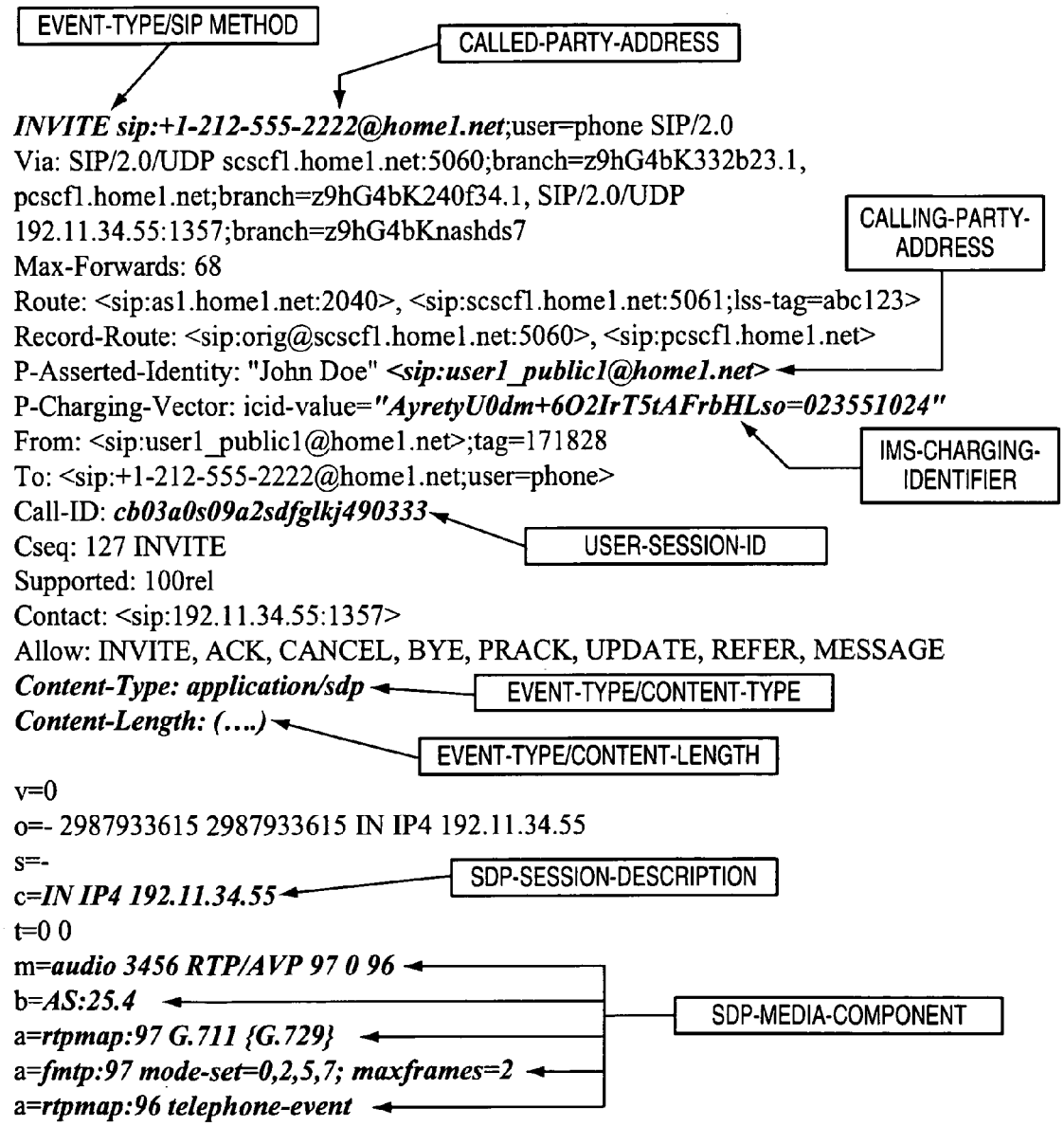

FIGS. 4-5 illustrate an exemplary mapping of information from a SIP INVITE message to a CCR message in an exemplary embodiment of the invention. FIG. 4 illustrates a SIP INVITE message. Assume that IMS gateway system 200 receives the SIP INVITE message during a session. FIG. 5 illustrates a CCR message. The CCR message includes a plurality of Attribute Value Pairs (AVP) that may or may not be populated with information from the INVITE message. AVP is a term for parameters or fields in Diameter Ro and Rf protocols. The following describes an exemplary mapping as performed by budget control system 204 of FIG. 2 according to parsing rules stored in control policy database 208. Reference to information in the INVITE message refers to FIG. 4 while reference to the AVPs of the CCR message refers to FIG. 5.

In parsing the INVITE message, budget control system 204 identifies the Event-Type/SIP Method parameter from the INVITE message and includes the information in the associated AVP of the CCR message. Budget control system 204 identifies the Called-Party-Address parameter from the INVITE message and includes the information in the associated AVP of the CCR message. Budget control system 204 identifies the Calling-Party-Address parameter from the INVITE message and includes the information in the associated AVP of the CCR message. Budget control system 204 identifies the IMS-Charging-Identifier parameter from the INVITE message and includes the information in the associated AVP of the CCR message. Budget control system 204 identifies the User-Session-ID parameter from the INVITE message and includes the information in the associated AVP of the CCR message. Budget control system 204 identifies the Event-Type/Content-Type parameter from the INVITE message and includes the information in the associated AVP of the CCR message. Budget control system 204 identifies the Event-Type/Content-Length parameter from the INVITE message and includes the information in the associated AVP of the CCR message. Budget control system 204 identifies the SDP-Session-Description parameter from the INVITE message and includes the information in the associated AVP of the CCR message. Budget control system 204 identifies the SDP-Media-Component(s) parameter from the INVITE message and includes the information in the associated AVP(s) of the CCR message. Budget control system 204 may map more or less parameters from the INVITE message to the CCR as desired.

Budget control system 204 parses the INVITE message as described above to fill the AVPs of the CCR message. Other AVPs may be filled using information from other sources. In FIG. 5, budget control system 204 has included media information for the session in the SDP-Media-Component AVP of the CCR. The media information indicates the new media used for the session. In this example, the media is audio. When OCS 220 subsequently receives the CCR from budget control system 204 (see FIG. 2), OCS 220 can re-rate the session based on the new media indicated in CCR.

Figure 6:
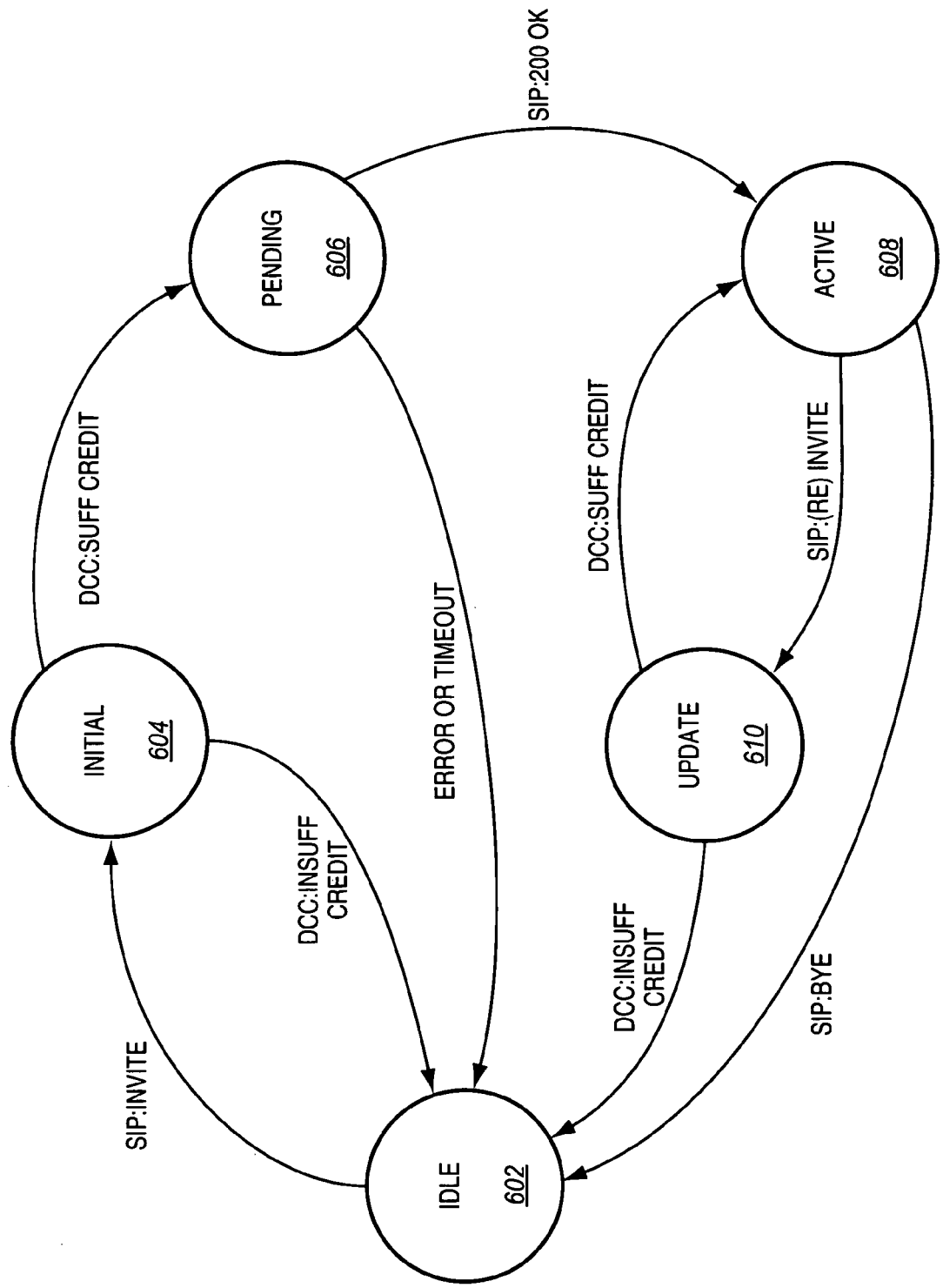
FIG. 6 illustrates a state model that may be used by a budget control system in an exemplary embodiment of the invention.

The operation of budget control system 204 in FIG. 2 may be further characterized by a state model. FIG. 6 illustrates a state model that may be used by budget control system 204 in an exemplary embodiment of the invention. The state model in FIG. 6 is just one example, and IMS gateway system 200 may operate differently in other embodiments. In this embodiment of IMS gateway system 200, session control interface 202 comprises an ISC interface using SIP, and charging interface 206 comprises a Diameter Ro interface.

In the state model shown in FIG. 6, SIP: XXX indicates a message received through the ISC interface (interface 202 in FIG. 2), and DCC: xxx indicates a message received through the Ro interface (interface 206 in FIG. 2).

For the state model, budget control system 204 of IMS gateway system 200 (see FIG. 2) is initially in an Idle state 602. When budget control system 204 receives a SIP INVITE message for a new SIP session, budget control system 204 transmits a CCR message to OCS 220 for an initial credit check. Budget control system 204 then moves from the Idle state 602 to an Initial state 604 and waits for a response from OCS 220. If budget control system 204 receives a CCA message from OCS 220 indicating that there is insufficient credit in the subscriber's account, then budget control system 204 transmits a SIP BYE message to S-CSCF 210 to release the session. Budget control system 204 then returns to the Idle state 602. If budget control system 204 receives a CCA message from OCS 220 indicating that there is sufficient credit in the subscriber's account, then budget control system 204 moves from the Initial state 604 to a Pending state 606 and waits for the SIP session to be established. The CCA message from OCS 220 includes a quota for the session.

If budget control system 204 receives a SIP 200 OK message indicating that the session has been established, then budget control system 204 moves from the Pending state 606 to an Active state 608. If budget control system 204 receives an error message or times out, then budget control system 204 returns to the Idle state 602.

In the Active state 608, budget control system 204 performs budget control. As part of budget control, budget control system 204 debits the quota provided by OCS 220 based on usage during the session. If budget control system 204 receives a SIP (Re) INVITE message from S-CSCF 210 or if the allocated quota has been depleted, then budget control system 204 transmits a CCR message to OCS 220 to obtain a new quota. If a SIP (Re) INVITE message is received, the SIP (Re) INVITE message includes information on a new media for the session. Budget control system 204 includes the information on the new media in the CCR message. Budget control system 204 then moves from the Active state 608 to an Update state 610. Budget control system 204 waits for a response from OCS 220.

If budget control system 204 receives a CCA message from OCS 220 indicating that there is insufficient credit in the subscriber's account, then budget control system 204 transmits a SIP BYE message to S-CSCF 210 to release the session. Budget control system 204 returns to the Idle state 602. If budget control system 204 receives a CCA message from OCS 220 indicating that there is sufficient credit in the subscriber's account, then budget control system 204 moves from the Update state 610 to the Active state 608 and performs budget control based on the new quota provided by OCS 220 for the new media for the session.

In the Active state 608 or any of the other states, if budget control system 204 receives a SIP BYE message or similar message, then budget control system 204 returns to the Idle state 602 and the session is released.

Figure 7A:
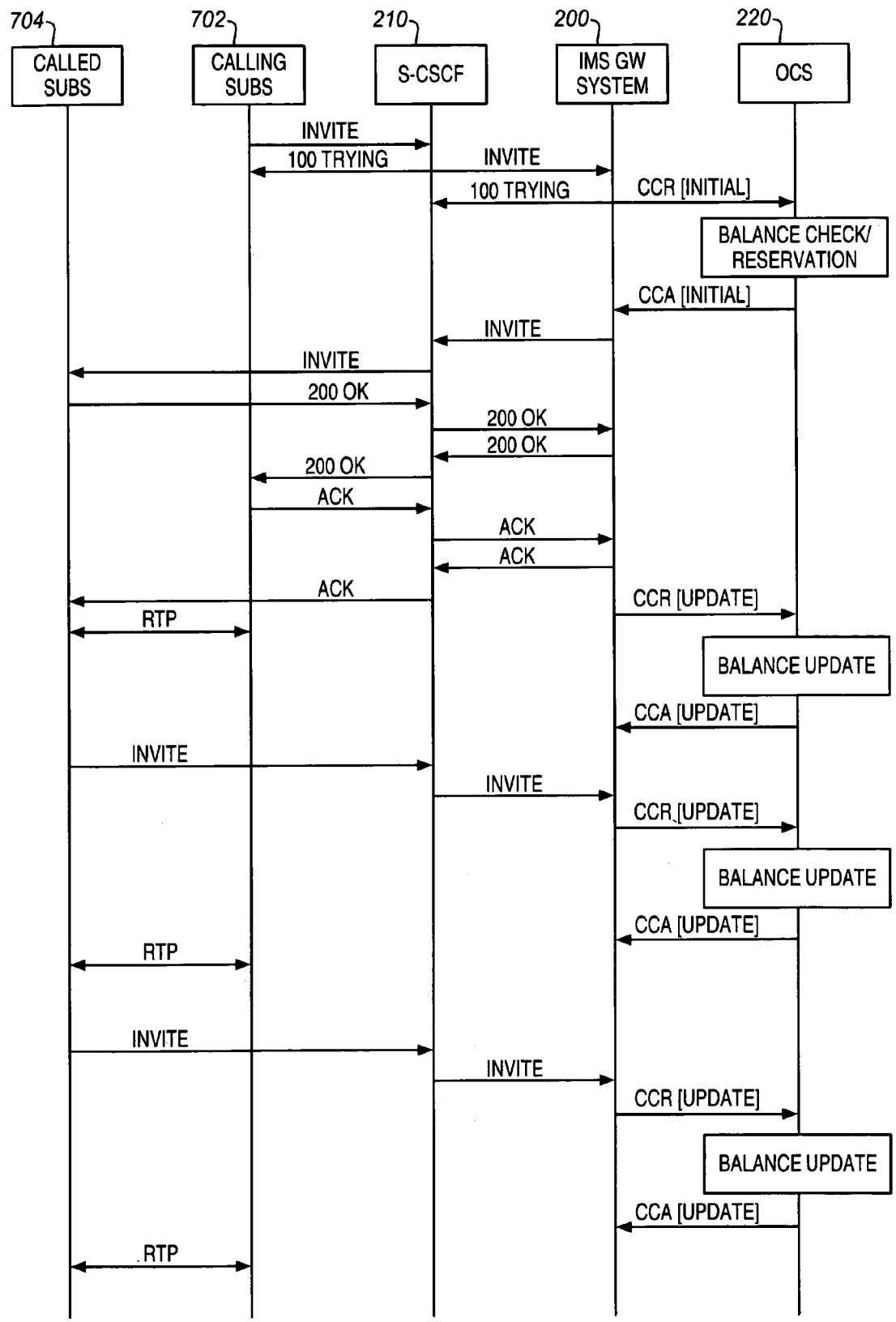
FIGS. 7A-7B are message diagrams illustrating exemplary budget control by an IMS gateway system in an exemplary embodiment of the invention.
Figure 7B:
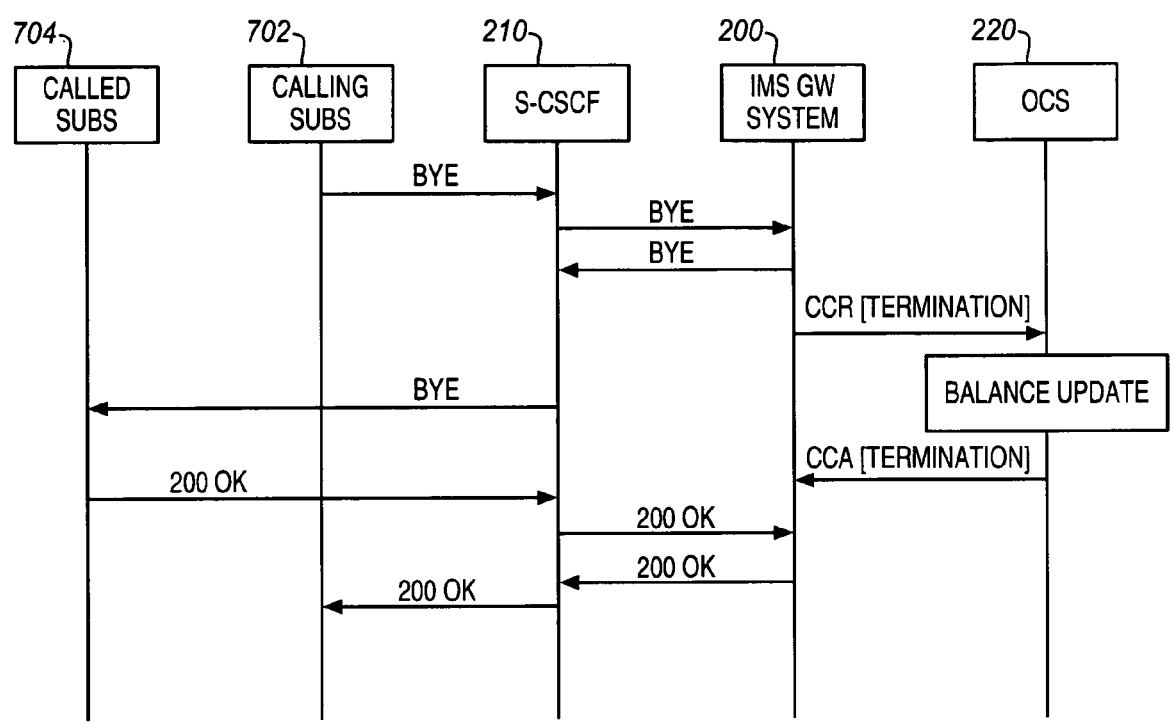

FIGS. 7A-7B are message diagrams illustrating exemplary budget control by IMS gateway system 200 in an exemplary embodiment of the invention. Again in this embodiment, session control interface 202 comprises an ISC interface using SIP, and charging interface 206 comprises a Diameter Ro interface. This example focuses on budget control functionality and illustrates the SIP messages required to create a SIP session. Other SIP messages may be used in an actual session.

In FIG. 7A, a session is being established between a calling subscriber 702 and a called subscriber 704. Calling subscriber 702 initiates a SIP INVITE message to S-CSCF 210. S-CSCF 210 determines that calling subscriber 702 is a pre-paid subscriber based on a subscriber profile downloaded from a Home Subscriber Server (HSS). S-CSCF 210 then transmits the INVITE message to the IMS gateway system 200. IMS gateway system 200 identifies a media description for the session in the INVITE message. Assume for this example that IMS gateway system 200 identifies media information in the media description, at least in part, to be:

m=audio 49170 RTP/AVP 0 a=rtpmap:0 PCMU/8000

IMS gateway system 200 generates a Diameter Credit Control Request (CCR) [INITIAL] message and maps the media information, and other information, from the INVITE message into the CCR [INITIAL] message. IMS gateway system 200 then transmits the CCR [INITIAL] to OCS 220 for credit authorization.

Responsive to the CCR [INITIAL], OCS 220 grants quota units that are allocated based on the audio PCMU encode charge rate. The charge rating is configured in OCS 220, which could based on media type, bandwidth, encode mechanism, QoS, etc. OCS 220 generates a Diameter Credit Control Answer (CCA) [INITIAL] message. OCS 220 includes the granted quota in the Quota AVP of the CCA [INITIAL] message. OCS 220 transmits the CCA [INITIAL] to IMS gateway system 200.

IMS gateway system 200 transmits a SIP INVITE message to S-CSCF 210, which transmits the INVITE message to called subscriber 704. Called subscriber 704 responds with a 200 OK message to S-CSCF 210, which forwards the 200 OK message to IMS gateway system 200. Called subscriber 704 may also transmit a provisional response, but the media information in the provisional response will be kept in session status database 209 and will not trigger a CCR [UPDATE] message. IMS gateway system 200 transmits the 200 OK message to S-CSCF 210, which forwards the SIP OK message to calling subscriber 702.

Calling subscriber 702 acknowledges the 200 OK with a SIP ACK message to S-CSCF 210. S-CSCF 210 transmits the SIP ACK message to IMS gateway system 200. IMS gateway system 200 transmits the SIP ACK message to S-CSCF 210, which forwards to the ACK message to called subscriber 704. The media session between calling subscriber 702 and called subscriber 704 is now established using the requested media (illustrated as RTP).

IMS gateway system 200 transmits a CCR [UPDATE] message to OCS 220 with the final negotiated media information to update the balance reservation. OCS 220 returns a CCA [UPDATE] message with the allocated quota information. IMS gateway system 200 begins debiting the allocated quota for the session.

Assume that before the quota is depleted, called subscriber 704 changes the media for the session. For instance, if the initial media for the session is audio, called subscriber 704 (or calling subscriber 702) may change the session from audio to audio/video. To make this change to the media, called subscriber 704 transmits a SIP (Re) INVITE message to S-CSCF 210, which forwards the INVITE message to IMS gateway system 200.

IMS gateway system 200 identifies a media description for the session in the (Re) INVITE message. Assume for this example that IMS gateway system 200 identifies media information in the media description, at least in part, to be:

m=audio 49170 RTP/AVP 0 a=rtpmap:0 PCMU/8000 m=video 51372 RTP/AVP 31 a=rtpmap:31 H261/90000

IMS gateway system 200 generates a CCR [UPDATE] message and maps the media information, and other information, from the INVITE message into the CCR [UPDATE] message. IMS gateway system 200 then transmits the CCR [UPDATE] message to OCS 220. OCS 220 updates the calling subscriber's balance based on information in the CCR [UPDATE] of the quota actually used, and re-calculates a new quota and time for the session based on the media change. For instance, OCS 220 updates the balance of calling subscriber 702 for the audio part, and determines a new quota based on the audio and H.261 video charge rate. OCS 220 then transmits a CCA [UPDATE] message to IMS gateway system 200 indicating the new quota. IMS gateway system 200 sets up a new timer based on the new quota that reflects a new charge rate. The session is now operating using the newly requested media (illustrated as RTP).

Assume that before the quota is depleted, called subscriber 704 again changes the media for the session. For instance, called subscriber 704 may change the H.261 video to MPEG video. To make this change to the media, called subscriber 704 transmits a SIP (Re) INVITE message to S-CSCF 210, which forwards the INVITE message to IMS gateway system 200.

IMS gateway system 200 identifies a media description for the session in the (Re) INVITE message. Assume for this example that IMS gateway system 200 identifies media information in the media description, at least in part, to be:

m=audio 49920 RTP/AVP 0 a=rtpmap:0 PCMU/8000 m=video 0 RTP/AVP 31 m=video 53000 RTP/AVP 32 a=rtpmap:32 MPV/90000

IMS gateway system 200 generates a CCR [UPDATE] message and maps the media information, and other information, from the INVITE message into the CCR [UPDATE] message. IMS gateway system 200 then transmits the CCR [UPDATE] message to OCS 220. OCS 220 updates the calling subscriber's balance based on information in the CCR [UPDATE] of the quota actually used, and re-calculates a new quota and time for the session based on the media change. For instance, OCS 220 updates the balance of calling subscriber 702 for the audio and H.261 video, and determines a new quota based on the audio and MPEG video charge rate. OCS 220 then transmits a CCA [UPDATE] message to IMS gateway system 200 indicating the new quota. IMS gateway system 200 sets up a new timer based on the new quota that reflects a new charge rate. The session is now operating using the newly requested media (illustrated as RTP).

In FIG. 7B, to terminate the session at a later time, calling subscriber 702 transmits a SIP BYE to S-CSCF 210, which forwards the BYE message to IMS gateway system 200. IMS gateway system 200 transmits the BYE message to S-CSCF 210, which forwards the BYE message to called subscriber 704. IMS gateway system 200 also transmits a CCR [TERMINATION] message to OCS 220 with the quota actually used and media information for the session. Responsive to the CCR [TERMINATION] message, OCS 220 updates the balance in the account of calling subscriber 702, and transmits a CCA [TERMINATION] message to IMS gateway system 200. The Diameter session is then cleared.

Called subscriber 704 transmits a 200 OK message to S-CSCF 210, which forwards the 200 OK message to IMS gateway system 200. IMS gateway system 220 transmits the 200 OK message to S-CSCF 210, which forwards the 200 OK message to calling subscriber 702. The SIP session is thus terminated.

As illustrated in the above embodiments, IMS gateway system 200 parses the SDP session description of the INVITE message to identify the media indicated in the INVITE message and identify a media change for the session. IMS gateway system 200 then maps parameters from the INVITE message to a CCR [UPDATE] message, and transmits the CCR [UPDATE] message to OCS 220. IMS gateway system 200 can thus handle online charging for media changes during the session.

Figure 8:
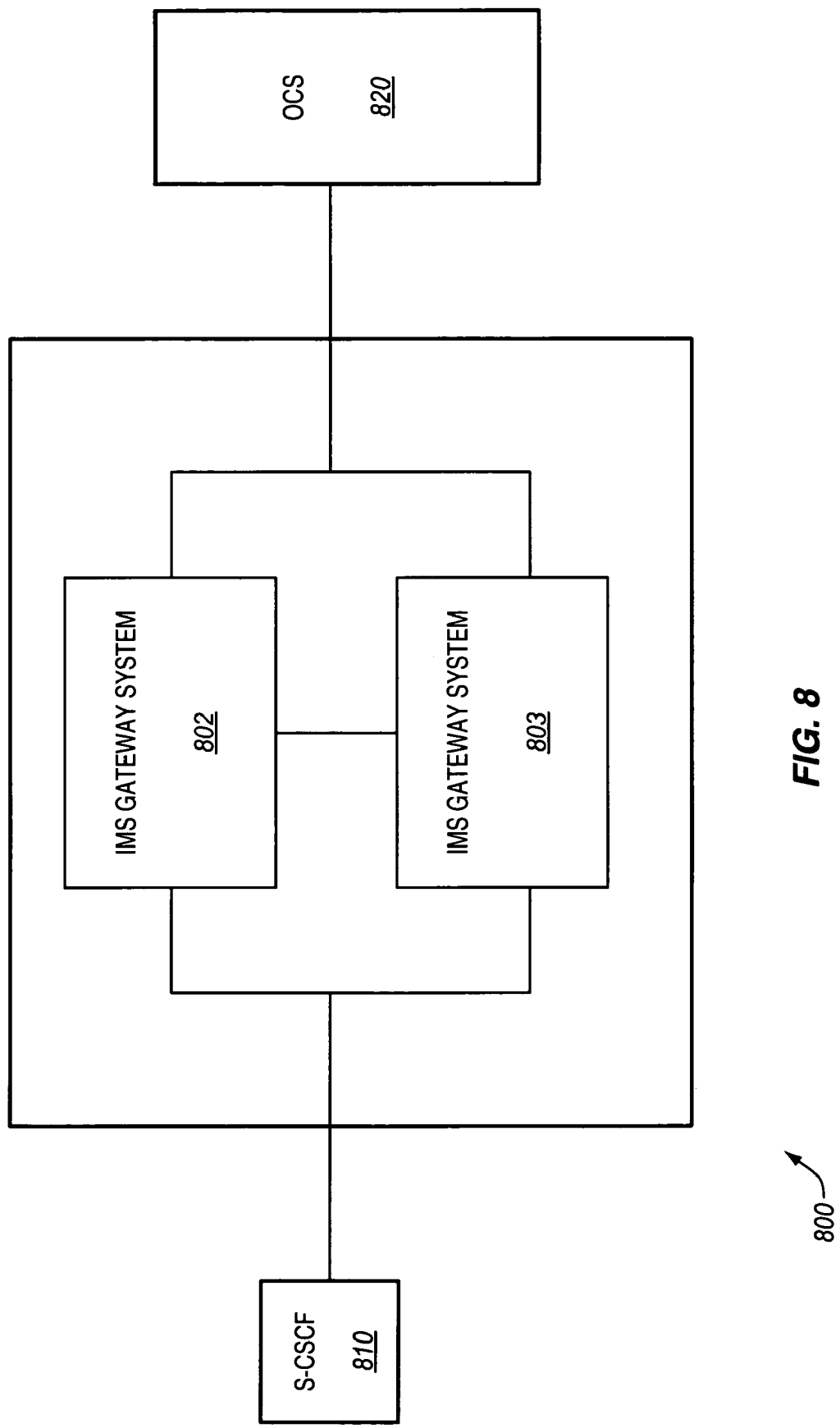
FIG. 8 illustrates an IMS network that includes redundant IMS gateway systems in an exemplary embodiment of the invention.

FIG. 8 illustrates an IMS network 800 that includes redundant IMS gateway systems 802-803 in an exemplary embodiment of the invention. IMS gateway system 802 and IMS gateway system 803 connect to an S-CSCF 810 and an OCS 820. IMS gateway systems 802-803 add redundancy to the IMS network architecture, which improves the reliability of the network.

IMS gateway systems 802-803 have state-based SIP applications and state-based Diameter applications. Therefore, the session states should be in sync between the mated pair of IMS gateway systems 802-803 to support high reliability and high availability.

To synchronize IMS gateway systems 802-803, the active IMS gateway system (assume IMS gateway system 802) of the pair receives session control messages from S-CSCF 810 and receives charging response messages from OCS 820 for a session. After processing a message for a call, the active IMS gateway system 802 transmits a message to the standby IMS gateway system 803 with the updated state information for that session. Active IMS gateway system 802 periodically transmits heartbeat messages to standby IMS gateway system 803 and vice-versa, which allows them to monitor each other's health. If active IMS gateway system 802 does not receive a heartbeat message back from standby IMS gateway system 803, then active IMS gateway system 802 generates an alarm.

If standby IMS gateway system 803 does not receive a heartbeat message back from active IMS gateway system 802, then standby IMS gateway system 803 assumes the role of the active IMS gateway system. IMS gateway system 803 establishes sockets with S-CSCF 810 and OCS 820, and these elements begin sending messages to IMS gateway system 803. When IMS gateway system 802 recovers from its failed state, it assumes the role of the standby IMS gateway system.

Figure 9:
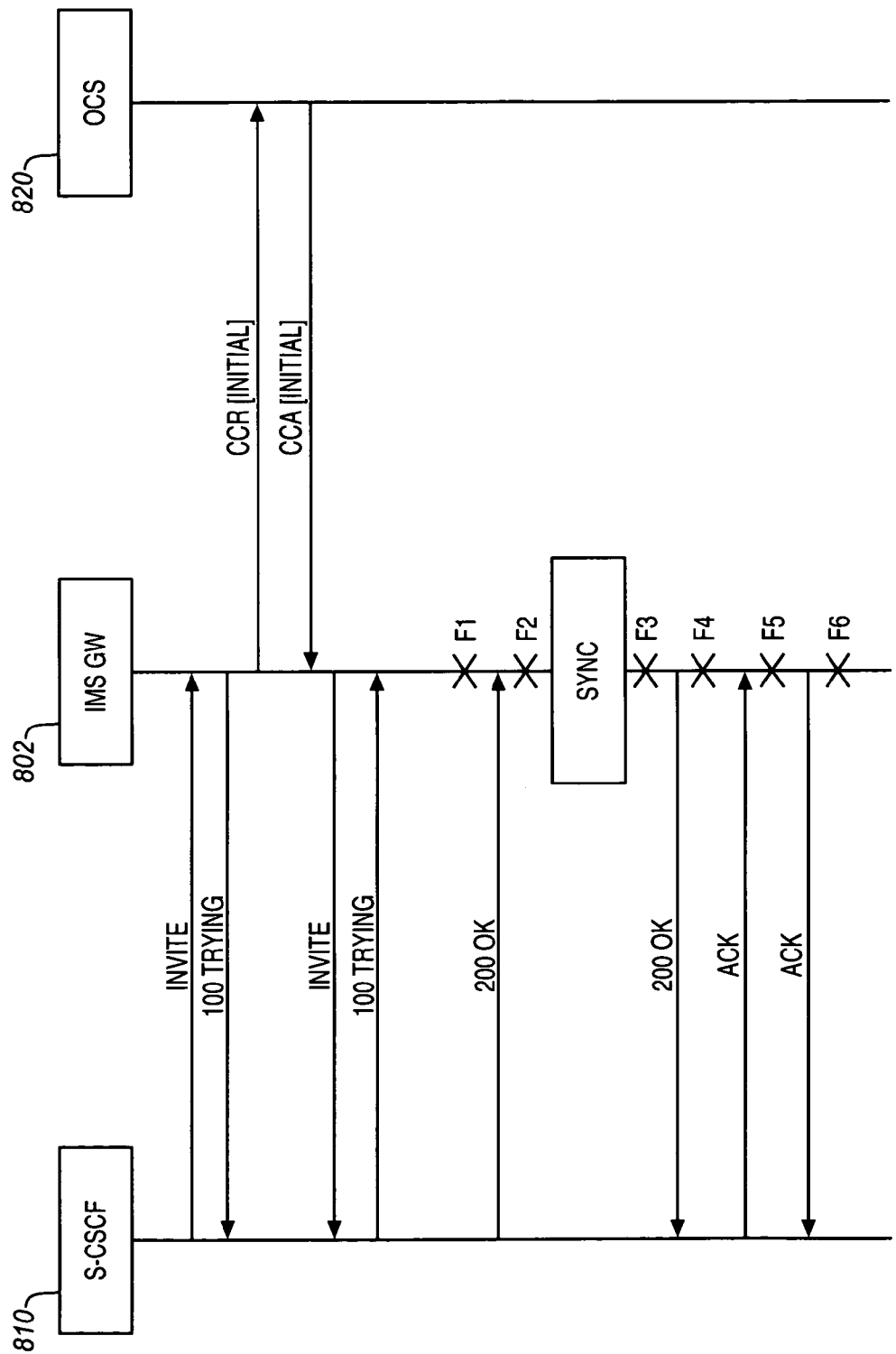
FIG. 9 is a message diagram illustrating different failure scenarios for redundant IMS gateway systems in an exemplary embodiment of the invention.

FIG. 9 is a message diagram illustrating different failure scenarios for the redundant IMS gateway systems 802-803 in an exemplary embodiment of the invention. In normal operation, S-CSCF 810 transmits a SIP INVITE message to active IMS gateway system 802 to initiate a session. IMS gateway system 802 transmits a SIP 100 TRYING message to S-CSCF 810 and also transmits a CCR [INITIAL] message to OCS 820. IMS gateway system 802 receives a CCA [INITIAL] message from OCS 820. Responsive to the CCA [INITIAL] message, IMS gateway system 802 transmits a SIP INVITE message to S-CSCF 810. S-CSCF 810 transmits a SIP 200 OK message to IMS gateway system 802. IMS gateway system 802 then synchronizes with standby IMS gateway system 803 to provide standby IMS gateway system 803 with information for the session. IMS gateway system 802 then transmits a SIP 200 OK message to S-CSCF 810. S-CSCF 810 responds with a SIP ACK message. IMS gateway system 802 responds back with an ACK message to set up the session.

If IMS gateway system 802 has a failure before receiving the 200 OK message from S-CSCF 810, then the session is cancelled.

If IMS gateway system 802 has a failure before receiving the 200 OK message from S-CSCF 810 (F1), then standby IMS gateway system 803 receives the 200 OK message. However, standby IMS gateway system 803 does not have information for the session, and transmits a SIP BYE message to release the call.

If IMS gateway system 802 has a failure after receiving the 200 OK message from S-CSCF 810 (F2), then standby IMS gateway system 803 receives a 200 OK message that is re-transmitted by S-CSCF 810. However, standby IMS gateway system 803 does not have information for the session, and transmits a SIP BYE message to release the call.

If IMS gateway system 802 has a failure after synchronizing with standby IMS gateway system 803 (F3), then IMS gateway system 803 has information for the session. IMS gateway system 803 receives a 200 OK message that is re-transmitted by S-CSCF 810. IMS gateway system 803 then transmits a 200 OK message to S-CSCF 810.

If IMS gateway system 802 has a failure after transmitting the 200 OK message to S-CSCF 810 and the 200 OK message was not delivered reliably before failover (F4), then S-CSCF 810 will re-transmit the 200 OK message to IMS gateway system 803. IMS gateway system 803 then transmits a 200 OK message to S-CSCF 810.

If IMS gateway system 802 has a failure after receiving the ACK message from S-CSCF 810 (F5), then a stable session has been established and IMS gateway system 803 may handle the session in a normal fashion.

Although specific embodiments were described herein, the scope of the invention is not limited to those specific embodiments. The scope of the invention is defined by the following claims and any equivalents thereof.

We claim:

1. An IMS gateway system for an IMS network, the IMS gateway system comprising:
    a control policy database adapted to store session control policies defining triggers for initiating charging request messages to an online charging system (OCS);
    a session control interface adapted to receive a session control message during an active IMS session from a serving-call session control function (S-CSCF) of the IMS network, wherein the session control message includes information on a new media for the session;
    a budget control system adapted to process the session control message to identify a media change during the session, to process the session control policies in the control policy database to determine whether to trigger a charging request message in response to the session control message, and to generate a charging request message for the new media for the session based on the determination; and
    a charging interface adapted to transmit the charging request message to the OCS, wherein the charging request message includes information on the new media for the session.

2. The IMS gateway system of claim 1 wherein the budget control system is further adapted to:
    identify a media description in the session control message that includes the information on the new media for the session; and
    compare the new media indicated in the session control message to previous media indicated in a previous session control message to identify whether a media change has occurred.

3. The IMS gateway system of claim 2 wherein the session control message is in Session Initiation Protocol (SIP) and the media description is in Session Description Protocol (SDP).

4. The IMS gateway system of claim 1 wherein the media change comprises a change in media type.

5. The IMS gateway system of claim 1 wherein the media change comprises a change in media format.

6. The IMS gateway system of claim 1 wherein the budget control system is further adapted to:
    map parameters in the session control message to parameters in the charging request message.

7. The IMS gateway system of claim 1:
    wherein the session control interface comprises an IMS service control (ISC) interface; and
    wherein the session control message comprises a SIP INVITE message.

8. The IMS gateway system of claim 1:
    wherein the charging interface comprises a Diameter Ro interface; and
    wherein the charging request message comprises a Credit Control Request (CCR) message.

9. The IMS gateway system of claim 1 wherein the budget control system is further adapted to:
    receive a charging response message from the OCS;
    provide budget control based on a quota provided in the charging response message by debiting the quota provided by the OCS based on usage during the IMS session; and
    process the session control policies in the control policy database when providing budget control to determine whether to trigger another charging request message to the OCS to request a new quota for the IMS session;
    wherein the session control policies indicate a threshold for an allocated quota that triggers a request for a new quota.

10. A method performed in an IMS gateway system for providing online charging in an IMS network, the IMS gateway system is implemented between a serving-call session control function (S-CSCF) and an online charging system (OCS), the method comprising:
    storing session control policies defining triggers for initiating charging request messages to the OCS;
    receiving a session control message during an active IMS session in the IMS gateway system from the S-CSCF of the IMS network, wherein the session control message includes information on a new media for the session;
    processing the session control message in the IMS gateway system to identify a media change during the session;
    processing the session control policies to determine whether to trigger a charging request message in response to the session control message;
    generating a charging request message in the IMS gateway system for the new media for the session based on the determination; and
    transmitting the charging request message from the IMS gateway system to the OCS of the IMS network, wherein the charging request message includes information on the new media for the session.

11. The method of claim 10 wherein processing the session control message in the IMS gateway system to identify a media change during the session comprises:
    identifying a media description in the session control message that includes the information on the new media for the session; and
    comparing the new media indicated in the session control message to previous media indicated in a previous session control message to identify whether a media change has occurred.

12. The method of claim 11 wherein the session control message is in Session Initiation Protocol (SIP) and the media description is in Session Description Protocol (SDP).

13. The method of claim 10 wherein the media change comprises a change in media type.

14. The method of claim 10 wherein the media change comprises a change in media format.

15. The method of claim 10 further comprising:
    mapping parameters in the session control message to parameters in the charging request message.

16. The method of claim 10 further comprising:
    receiving a charging response message from the OCS;
    providing budget control based on a quota provided in the charging response message by debiting the quota provided by the OCS based on usage during the IMS session; and processing the session control policies when providing budget control to determine whether to trigger another charging request message to the OCS to request a new quota for the IMS session;

wherein the session control policies indicate a threshold for an allocated quota that triggers a request for a new quota.

17. An IMS network, comprising:

a serving-call session control function (S-CSCF) adapted to serve an IMS session in the IMS network;

an online charging system (OCS) adapted to provide billing for the session; and an IMS gateway system implemented between the S-CSCF and the OCS to facilitate billing for the session, the IMS gateway system being adapted to:

store session control policies defining triggers for initiating charging request messages to the OCS;

receive a SIP INVITE message for an active IMS session from the S-CSCF, wherein the INVITE message includes information on a new media for the session;

process the INVITE message to identify a media change during the session;

process the session control policies to determine whether to trigger a Diameter credit control request (CCR) message in response to the INVITE message;

generate the CCR message for the new media for the session based on the determination; and transmit the CCR message to the OCS, wherein the CCR message includes information on the new media for the session.

18. The IMS network of claim 17 wherein:

the INVITE message includes a media description in Session Description Protocol (SDP) that includes the information on the new media for the session; and the IMS gateway system is further adapted to:

identify the media description in the INVITE message that includes the information on the new media for the session; and compare the new media indicated in the INVITE message to previous media indicated in a previous INVITE message to identify whether a media change has occurred.

19. The IMS network of claim 18 wherein the IMS gateway system is further adapted to:

map parameters of the INVITE message to parameters in the CCR message.

20. The IMS network of claim 17 wherein the media change comprises at least one of a change in media type and a change in media format.

* * * * *